W. CHURCHILL.
REFRACTING COVER GLASS FOR AUTOMOBILE HEADLIGHTS.
APPLICATION FILED APR. 8, 1916.

1,193,873.  
Patented Aug. 8, 1916.

Inventor  
William Churchill  
By  
Attorney

UNITED STATES PATENT OFFICE.

WILLIAM CHURCHILL, OF CORNING, NEW YORK, ASSIGNOR TO CORNING GLASS WORKS, OF CORNING, NEW YORK, A CORPORATION OF NEW YORK.

REFRACTING COVER-GLASS FOR AUTOMOBILE-HEADLIGHTS.

1,193,873.

Specification of Letters Patent.  Patented Aug. 8, 1916.

Original application filed November 22, 1915, Serial No. 62,756. Divided and this application filed April 8, 1916. Serial No. 89,990.

*To all whom it may concern:*

Be it known that I, WILLIAM CHURCHILL, a citizen of the United States of America, and a resident of Corning, New York, have invented certain new and useful Improvements in Refracting Cover-Glasses for Automobile-Headlights, of which the following is a specification.

This application, which is filed as a division of my prior application, Serial No. 62,756, filed Nov. 22, 1915, has for its object to provide a simple cover glass especially adapted for use in front of the lamp and reflector which commonly forms part of an automobile projector, and it has for its purpose to provide such a construction thereof that the light from the lamp, after reflection from the reflector is thrown downwardly in respect to the axis of the mirror, without the formation of dark bands, and with a satisfactory distribution of the beam, both for distance and close lighting.

It has been heretofore proposed to form upon the cover glasses of projectors straight prisms, the bases of which are down, and which tend, therefore, to bend the beam from the mirror downwardly in front of the machine. It has been difficult in this construction to secure a proper distribution of the light, and to prevent the formation of dark zones. I accomplish the first of these, and prevent the formation of the latter, by arranging certain of such faces in a group, the refractive power of the several faces of which increases from the top downwardly, while below such group is another group of faces, the refractive power of at least one of the faces of which is greater than the refractive power of at least one of the faces of the first group. Obviously, the several groups may, if desired, be similar, and also if desired, such similar groups may be similarly disposed in relation to each other, and my invention therefore further comprises a projector glass having thereon similar groups of prismatic faces, the faces of each group differing among themselves in refractive power, and preferably increasing in such power, from the upper face of each group downwardly.

Figure 1:
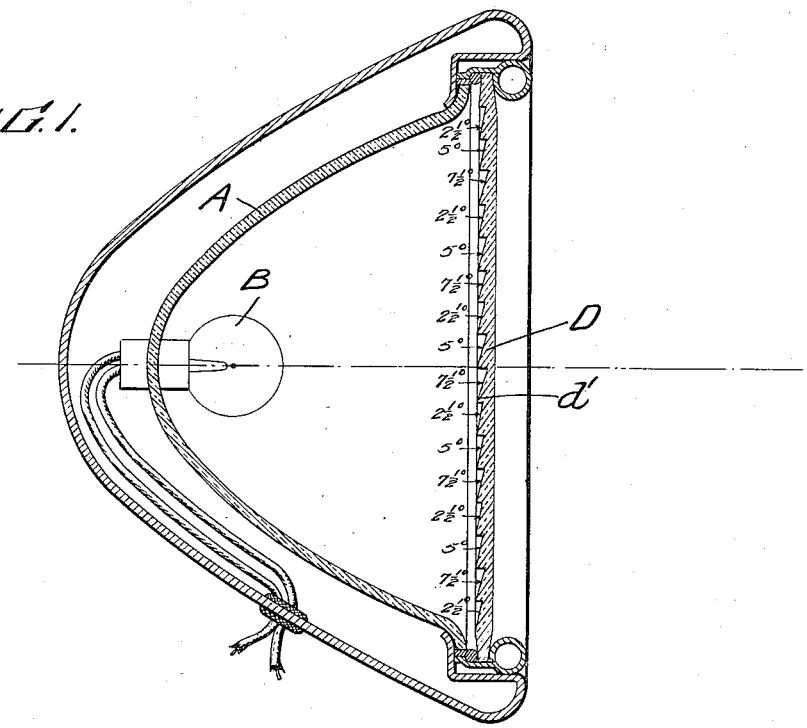
Figure 2:
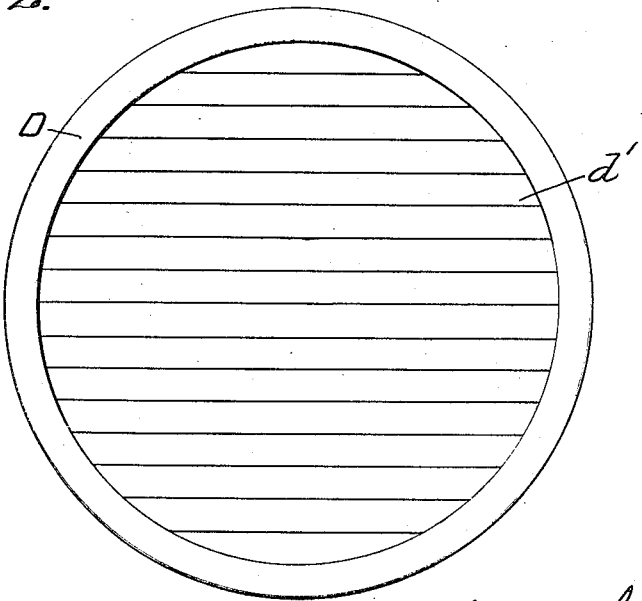

Referring to the accompanying drawings in which corresponding parts are designated by corresponding marks of reference,—Figure 1 is a section through a head-light having my invention applied thereto. Fig. 2 is a plan view thereof.

In these drawings, the head-light consists, as usual of the lamp B, properly located in respect to the reflector A, to project a more or less parallel beam. In front of the reflector is located the cover glass D, having a series of horizontal prisms $d'$ formed on its inner face, the bases of the prisms being downward. It is the purpose of these prisms to overcome to a desired extent the divergence of the projected beam upwardly from the axis of the reflectors and their refractive power is properly calculated to accomplish the end had in view. In the specific embodiment shown, the prisms are not of uniform refractive power, but are arranged in groups, the refractive power of each face of each group being different from the refractive power of every other face in such group, the refractive power of the prisms of each group increasing from the top downwardly. As shown, the prisms are arranged in five groups similar to each other, and similarly disposed in relation to each other, each group consisting of three prisms, having refractive powers of $2\frac{1}{2}°$, $5°$ and $7\frac{1}{2}°$, respectively. Here the minimum desired refraction of the rays for the particular object had in view for the specific case is $2\frac{1}{2}°$, and the increased refractive power of the other prisms has for its object increasing the deflection of the greater part of the projected rays, while the less refracted rays are projected axially.

It will be noted that in this cover glass, the beam of light projected by the reflector is bent as a whole downwardly, but that certain parts of it are refracted to a greater extent than other parts. By properly selecting the distribution of the refractive power of the various prisms, the desired distribution of light may be obtained.

Having thus described my invention, what I claim and desire to secure by Letters Patent is:—

1. A refracting cover glass having thereon similar groups of prismatic faces, the faces of certain of such groups differing among themselves in refractive power, the refractive power of the faces of each group increasing from the top downwardly.

2. A refracting cover glass having its face covered with a series of prismatic faces, such a series of faces being formed by the alternation of similar groups of faces, the refractive power of each face of each group being different from the refractive power of other faces of the same group.

3. The combination with a reflector projecting a substantially parallel beam of light, of a refracting cover glass in front of such reflector having thereon similar groups of prismatic faces, the faces of certain of such groups differing among themselves in refractive power, the refractive power of the faces of each group increasing from the top downwardly.

4. The combination with a reflector projecting a substantially parallel beam of light, of a refracting cover glass in front of such reflector covered with a series of prismatic faces, such series of faces being formed by the alternation of similar groups of faces, the refractive power of each face of each group being different from the refractive power of other faces in the same group.

WILLIAM CHURCHILL.